Patented Aug. 28, 1928.

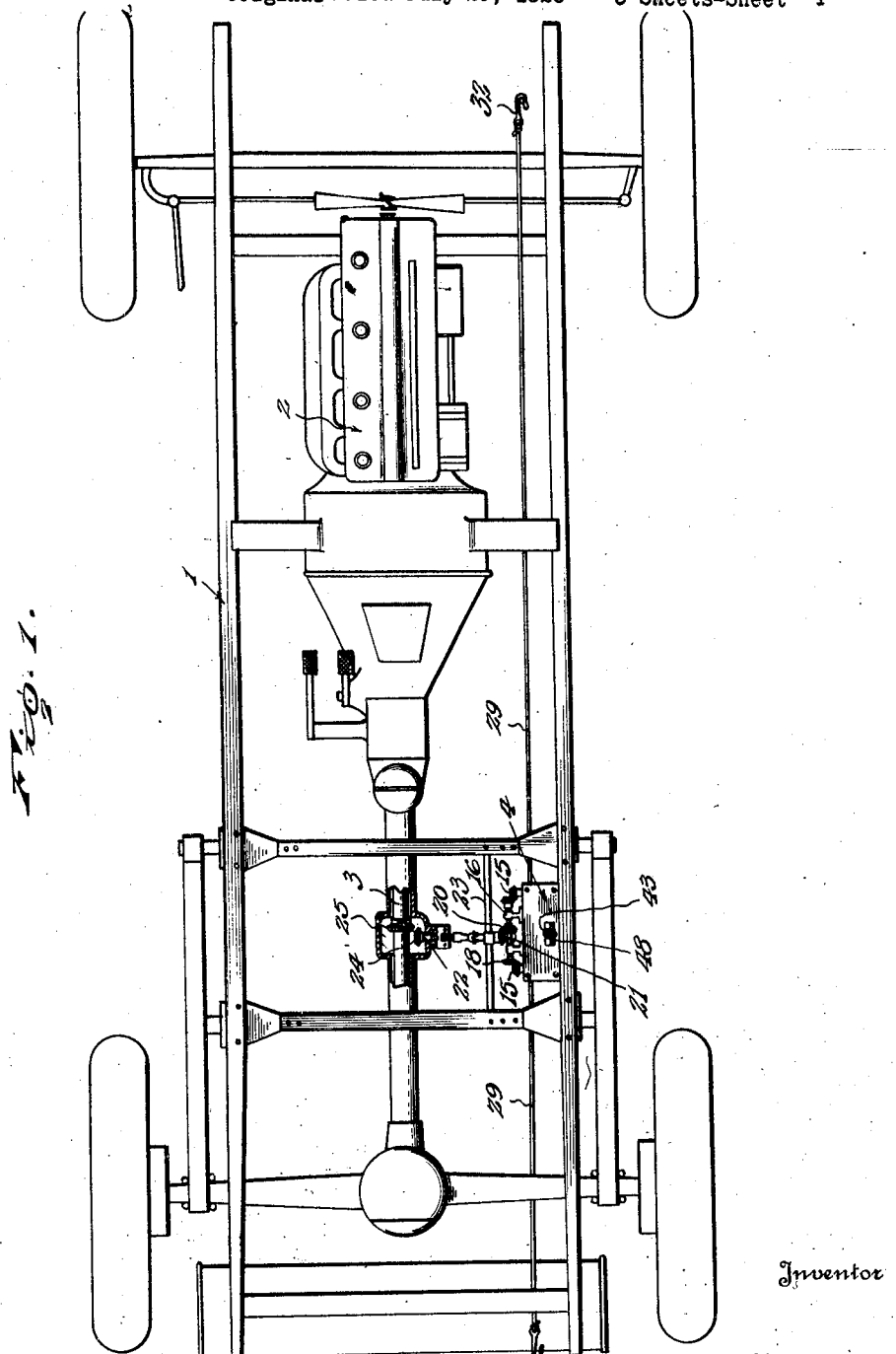

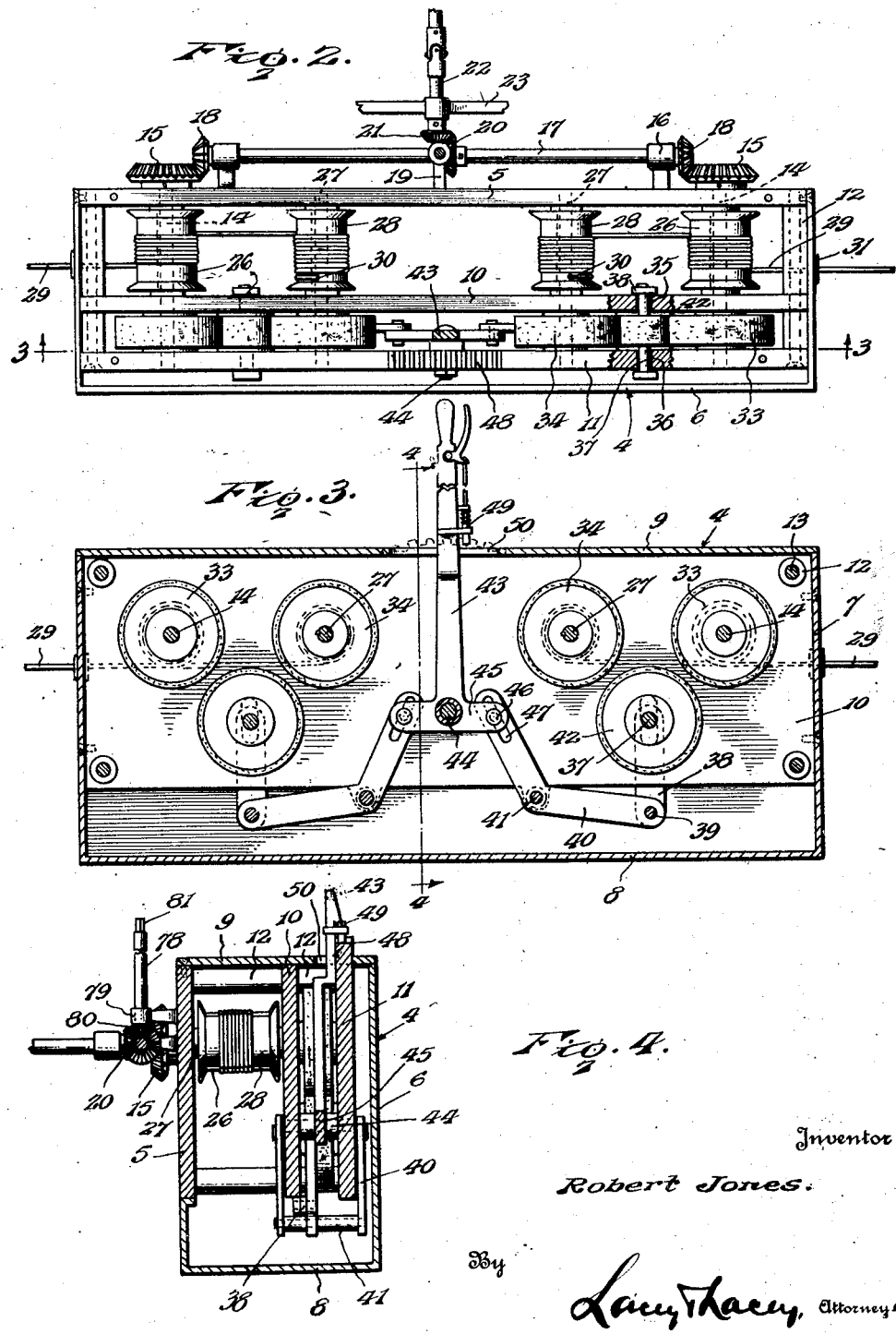

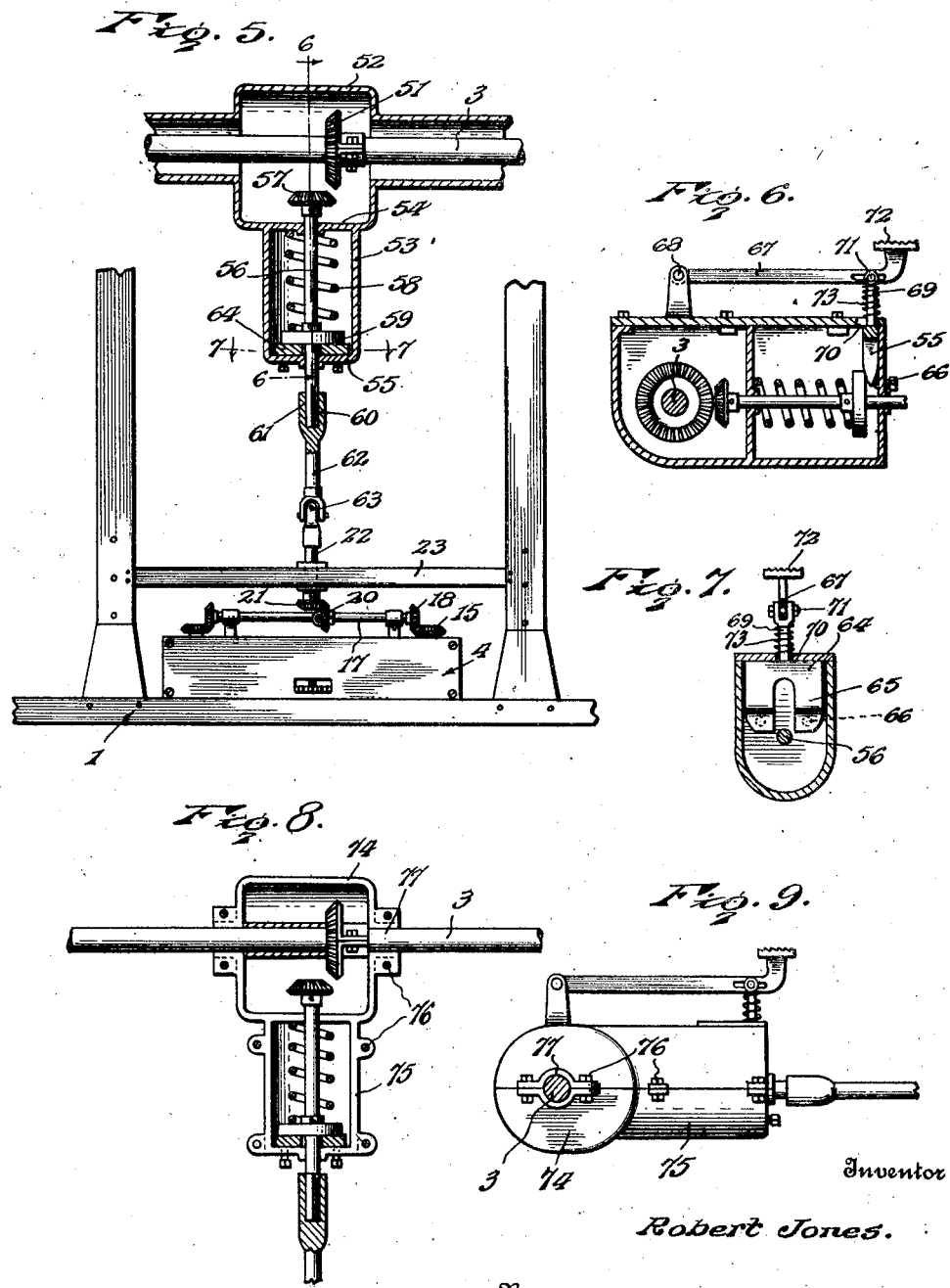

1,682,284

UNITED STATES PATENT OFFICE.

ROBERT JONES, OF MILWAUKEE, WISCONSIN.

AUTOMOBILE EXTRICATING MECHANISM.

Application filed July 29, 1926, Serial No. 125,801. Renewed July 3, 1928.

This invention relates to extricating mechanisms and has as its object to provide a mechanism adapted for installation upon an automobile and operable, through power derived from the automobile engine or motor, to extricate the automobile from a mudhole or rut.

Another object of the invention is to provide a mechanism which may be readily installed upon any of the ordinary types of motor vehicles and which may be immediately brought into use for the purpose of extricating the vehicle from a mudhole or rut, when the occasion arises, the mechanism being ordinarily idle and in no way interfering with the customary operation of the vehicle.

The invention contemplates the employment of two pulling cables extensible beyond the front and rear ends of the automobile in connection with which the mechanism is employed, and a further object of the invention is to provide means whereby these cables may be selectively paid out to a sufficient distance to enable them to be engaged about some stationary object, and means whereby they may be selectively taken up, through power supplied from the engine, and thus effect extrication of the automobile from the rut or mudhole.

Another object of the invention is to provide for the ready taking up of the extended length of cable after the automobile has been extricated.

In the accompanying drawings:

Figure 1 is a plan view of the mechanism embodying the invention installed upon an automobile, only so much of the automobile as is necessary to an understanding of the invention, being shown in said figure.

Figure 2 is a detail plan view of the mechanism with the casing cover thereof removed.

Figure 3 is a vertical longitudinal sectional view taken substantially on the line 3—3 of Figure 2, looking in the direction indicated by the arrows.

Figure 4 is a vertical transverse sectional view taken substantially on the line 4—4 of Figure 3, looking in the direction indicated by the arrows.

Figure 5 is a view partly in horizontal section and partly in plan, illustrating the means provided for transmitting power from the propeller shaft of the vehicle to the mechanism embodying the invention.

Figure 6 is a vertical transverse sectional view taken substantially on the line 6—6 of Figure 5.

Figure 7 is a vertical sectional view taken substantially on the line 7—7 of Figure 5, looking in the direction indicated by the arrows.

Figure 8 is a view similar to Figure 5, illustrating a slight modification of the invention.

Figure 9 is a side elevation of the structure shown in Figure 8.

In Figure 1 of the drawings, the numeral 1 indicates in general the chassis frame of the automobile upon which the mechanism is installed, the numeral 2 the motor, and the numeral 3 the propeller shaft. The shaft 3, where the machine is of the truck type, is ordinarily exposed but it will be understood that on other types of automobiles where the shaft is mounted in a tubular housing, some provision will be made for the accommodation of the gear connection between this shaft and the mechanism of the present invention, which connection will presently be described.

The mechanism embodying the invention is preferably mounted within a casing indicated in general by the numeral 4 and said casing comprises side walls 5 and 6, end walls 7, a bottom 8, and a removable cover indicated by the numeral 9, the cover being secured in place in any suitable manner and the casing as a whole being of general rectangular form. The casing is secured in any suitable manner upon one of the side members of the chassis frame 1, preferably the right hand member, and at any point in the length thereof found most convenient. Arranged within the casing and extending longitudinally thereof between its end walls and in parallel planes, are partition walls indicated one by the numeral 10 and the other by the numeral 11. These walls are preferably secured to and supported by the side walls 5 and are suitably spaced therefrom and from each other by means of spacing sleeves 12 arranged upon the securing bolts 13. Shafts 14 are rotatably mounted in suitable bearings in the walls 5, 10 and 11, one near the front end of the casing and the other near the rear end of the casing, and fixed upon the ends of these shafts which project through the wall 5, are beveled gears indicated by the numeral 15. Bearing brackets 16 are mounted upon the outer side of the wall 5 of the casing and a shaft 17 is journaled in these brackets and has fixed upon its ends pinions 18 which mesh with the respective gears 15. The intermediate portion of the shaft 17 is journaled in a bearing bracket 19 upon the casing wall 5, and a beveled gear 20 is fixed upon this portion of the said shaft and meshes with a beveled pinion 21 which is fixed upon the adjacent end of a counter shaft 22 to which shaft motion is transmitted from the propeller shaft of the automobile in a manner which will presently be described.

Fixed upon each of the shafts 14 is a drum 26, the said drums being located between the side wall 5 and partition wall 10. Shafts 27 are rotatably mounted in suitable bearings in the walls 5, 10 and 11 of the casing parallel to and rearwardly and forwardly, respectively, of the front and rear shafts 14, and fixed upon each of the shafts 27 is a drum indicated by the numeral 28, this drum being of slightly less diameter than the companion drum 26. Cables 29 are connected each at one end to one of the drums 28, as at 30, and passed about said drum and thence about the respective drum 26 and then through a guide eye 31 in the respective end wall of the casing, each cable being provided at its free end with a hook indicated by the numeral 32. Friction gears 33 and 34 are fixed upon the shafts 14 and 27 respectively and are housed between the partition walls 10 and 11, as clearly shown in Figure 2.

The partition walls 10 and 11 are formed with vertically extending slots indicated respectively by the numerals 35 and 36, located opposite and approximately midway between the shafts 14 and 27, and these slots accommodate the end portions of shafts 37 which are journaled at their ends in the upper ends of supporting links 38 which are, in turn, supported at their lower ends by a cross pin 39, to which is pivotally connected one end of one arm of an angle lever 40. The lever 40 is mounted upon a shaft 41 and it will be understood that one of the levers is associated with each of the shafts 37. Friction gears 42 are mounted upon the shafts 37 and are located below and between the respective friction gears 33 and 34 and it will be evident at this point that by rocking the angle levers 40, the friction gears 42 may be selectively moved into and out of peripheral contact with the respective friction gears 33 and 34 and that when either gear 42 is in frictional contact with its respective gears 33 and 34, motion will be transmitted from the respective shaft 14 to the respective shaft 27 to rotate the respective drum 28 and wind up the cable 29 which is connected to said drum. It will likewise be understood, and particularly by reference to Figure 3 of the drawings, that by a proper adjustment of the angle levers 40, the gears 42 may be both positioned out of contact with their respective gears 33 and 34. In order that the angle levers 40 may be simultaneously adjusted in consonance with each other, a hand lever 43 is provided and is pivotally mounted at its lower end upon a shaft 44 supported by the partition wall 11. The lower end of the lever is provided with oppositely extending arms 45 carrying pins or studs 46 which work in slots 47 in the relatively adjacent arms of the angle levers 40, and it will be evident at this point that by swinging the lever in one direction, the gear supporting arm of one angle lever will be swung upwardly to bring the respective gear 42 into frictional contact with the respective gears 33 and 34 and the gear supporting arm of the other angle lever will be swung downwardly so as to move the respective gear 42 out of contact with the respective gears 33 and 34, and vice versa. Also, it will be evident that when the lever is swung to assume an intermediate position, as shown in Figure 3, the angle levers will be so positioned that both gears 42 will be out of contact with their respective gears 33 and 34. The wall 11 is provided upon its upper edge with a rack 48 of segmental form, and a pawl 49 is carried by the upper or handle end of the lever 43 and cooperates with the rack to hold the lever in adjusted position. The upper end of the lever 43 extends through a slot 50 in the top 9 of the casing for the mechanism and through the floor of the automobile body where it may be conveniently operated under conditions to be presently described.

The means provided for transmitting power to the shaft 22, and consequently to the cable drum, from the propeller shaft 3 of the automobile, is best shown in Figures 5, 6 and 7 of the drawings, and likewise Figures 8 and 9, which latter figures illustrate a modification of the said means. In Figures 5, 6 and 7, the numeral 51 indicates a beveled gear which is fixed upon the propeller shaft 3 within a housing 52 constituting a part of the housing ordinarily provided for the said shaft, and this housing has an extension 53 at one side thereof and separated therefrom by a dividing wall 54. The extension 53 has an end wall 55, and a shaft 56 is rotatably mounted in suitable bearings in the walls 54 and 55 with one end projecting into the housing 52 and supporting a fixed beveled gear 57 which is designed to mesh with the gear 51 under conditions to be presently explained, the shaft 56 being not only rotatably mounted in bearings in the walls 54 and 55 but also slidably mounted therein. A compression spring 58 is arranged within the extension 53 of the housing 52 and bears at one end against the wall 54 and at its other end against a head 59 which is fixed upon the shaft 56, the head 59 being located close to the wall 55 of the said housing extension. The end of the shaft which extends beyond the closed end or wall 55 of the housing extension is squared as indicated by the numeral 60 and engages in a similarly formed socket 61 in one end of a shaft section 62, the other end of which section is connected with the shaft 22 by means of a universal joint indicated by the numeral 63 so as to compensate for the usual relative displacement of the chassis frame and the propeller shaft in the travel of the automobile and yet connect the shafts 56 and 22 for rotation in unison when the gear 57 is in mesh with the gear 51. The numeral 64 indicates a wedge block which is mounted within the casing extension with one side disposed against the closed end 55 of said casing, and the said wedge block is provided with spaced wedge portions 65 which straddle the shaft 56, one face of the wedge engaging against the disc 59 and the other side of the wedge engaging against abutment and adjusting screws 66 which are adjustably threaded through the closed end 55 of the casing and may be adjusted to vary the throw of the wedge and likewise equalize the said throw, it being understood that when the wedge is shifted in a downward direction, the disc 59 will be moved away from the closed end 55 of the casing and effect corresponding movement of the shaft 56 to bring the gear 57 into mesh with the gear 51, such movement being against the tension of the spring 58. It will likewise be understood that when the wedge block 64 is shifted upwardly, the spring 58 will act to retract the shaft 56 and thus move the gear 57 out of mesh with the gear 51. In order that the wedge block may be actuated at the will of the operator, a lever 67 is pivotally mounted, as at 68, upon the upper side of the housing 52 or any other convenient support, and the wedge block is provided at its upper end with a stem 69 extending upwardly through a slot 70 formed in the upper side of the casing extension 53 and is pivotally connected at its upper end as at 71 to the outer end of the said lever 67, the said end of the lever being provided with a foot pedal indicated by the numeral 72. A spring 73 is arranged upon the stem 69 and bears at its lower end against the top of the casing extension and at its upper end against the foot pedal and tends to hold the lever in elevated position. The pedal 72 will be located above the floor board of the automobile and in position where it may be conveniently reached by the driver of the machine without the necessity of leaving his seat.

The modified form of the mechanism just described, which is illustrated in Figures 8 and 9 of the drawings, is identical with the form shown in Figures 5, 6 and 7, except that in this instance, the structure is designed for application to a propeller shaft which is not provided with the usual housing and, therefore, the housing and its extension which respectively correspond to the housing 52 and extension 53, and which are, in these figures, indicated by the numerals 74 and 75 respectively, are formed in two sections clamped together by bolts 76, the portions of the sections defining the main housing 74 having bearing portions 77 which fit the shaft 3 sufficiently loosely to provide against any binding of the shaft and yet constitute means for supporting the housing and its extension. Except for this slight change, the structure is identical, as will be observed by a comparison of the two groups of figures.

In the event the machine equipped with the extricating device becomes stuck in mud or in a rut, the first procedure in extricating the machine, consists in pulling out a suitable length of one one of the cables 29 and engaging the free end portion of the cable about a convenient fixed object such as a tree trunk. For example, if there is a tree adjacent the front end of the automobile, the foremost cable 29 will be paid out and fastened about the trunk of the tree by passing the free end portion of the cable about the trunk and then engaging the hook 32 with the stretch of the cable leading to the tree trunk. On the other hand, if it should be found more convenient to connect the rear cable with some conveniently located fixed object, this cable will be employed to the exclusion of the first mentioned cable. In either event, it will be understood that when the cable is paid out or unwound from the drum 28, the lever 43 will be in intermediate or neutral position and both friction gears 42 will be out of mesh with their respective gears 33 and 34 so that the respective drums 26 and 28 will be free to rotate. After the selected cable has been anchored to some fixed object, the lever 43 is adjusted so as to elevate the respective friction gear 42 into mesh with the respective friction gears 33 and 34, and the engine is set in operation. As the propeller shaft 3 rotates, motion will be transmitted to the shaft 17 and by way of the gears 18 and 15 to the the shaft 14 and its gear 33 and from this gear, by the gear 42 to the gear 34 and respective shaft 27, thus setting in motion the drum 28 and winding up the cable and thereby effecting forward motion of the automobile.

In order that either cable which has been paid out, may be rewound upon its respective drum 28, a shaft 78 is mounted in a bearing bracket 79 upon the side wall 5 of the casing of the mechanism and is provided at its lower end with a pinion 80 which meshes with the beveled gear 20. The shaft 78 extends vertically and has its upper end projecting a short distance through the floor of the automobile and squared, as indicated by the numeral 81, for the application thereto of a crank handle (not shown), by means of which the shaft may be rotated so as to impart rotary motion to the shaft 17 and consequently to the drum 28 upon which the cable is to be rewound.

It will be understood that while the invention is herein illustrated as applied to an automobile, it may be employed on water craft for the purpose of tying up to wharves and for drawing boats on the shore and, in fact, may be used in various other connections.

Having thus described the invention, what I claim is:

1. In mechanism of the class described, the combination with the propeller shaft of an automobile, of a countershaft mounted for rotation and longitudinal shifting movement, a gear upon the propeller shaft, a gear upon the countershaft, means yieldably holding the said last mentioned shaft shifted to position to disengage the last mentioned gear from the gear upon the propeller shaft, manually operable means for shifting the last mentioned shaft to bring the gear thereon into mesh with the gear upon the propeller shaft, a drum shaft driven from the said countershaft, a drum fixed upon the said shaft, a second drum shaft, a drum fixed to the last mentioned shaft, a cable wound about the first mentioned drum and connected to the second mentioned drum and having connecting means at its free end, a gear upon each of the drum shafts, and a gear movable into and out of mesh with the drum gears for transmitting motion to the second mentioned drum.

2. In mechanism of the class described, the combination with the propeller shaft of an automobile, of a shaft driven therefrom, a drum fixed thereto, a second shaft, a drum fixed thereto, a cable wound about the first mentioned drum and connected to the second mentioned drum and having connecting means at its free end, gears upon said shafts, and a gear movable into and out of mesh with the said gears for transmitting movement to the second mentioned shaft and its drum.

3. In mechanism of the class described, the combination with the propeller shaft of an automobile, of a shaft driven therefrom, a drum fixed thereto, a second shaft, a drum fixed thereto, a cable wound about the first mentioned drum and connected to the second named drum, and having connecting means at its free end, gears upon each of said shafts, a gear movable into and out of mesh with said gears for transmitting movement to the second named shaft and its drum, a rock lever, means connected with one arm of the rock lever supporting the last mentioned gear, and an operating lever operatively connected with the other arm of the rock lever for adjusting the said rock lever to shift the said last mentioned gear into and out of mesh with the first mentioned gears.

4. In mechanism of the class described, the combination with the propeller shaft of an automobile, of shafts driven thereby, drums fixed upon said shafts, second shafts having drums fixed thereto, cables wound about the drums of the first mentioned shafts and connected to the respective ones of the second named shafts and having connecting means at the free ends, the cables being led in opposite directions, a gear upon each of said shafts, gears movable into and out of mesh with each of the first mentioned gear for transmitting movement to the respective second named shafts and their drums, said means operating to consonantly adjust the last mentioned gears.

5. In mechanism of the class described, the combination with the propeller shaft of an automobile, of a shaft driven therefrom, a drum fixed thereto, a second shaft having a drum fixed thereto, a cable wound about the first mentioned drum and connected to the second mentioned drum and having connecting means at its free end, a gear upon each of said shafts, a gear movable into and out of mesh with said gears for transmitting movement to the second mentioned drum, and manually operable means independent of the propelling shaft for imparting rotary movement to the first mentioned drum supporting shaft.

6. In mechanism of the class described, the combination with the propeller shaft of an automobile, of shafts driven thereby, drums fixed upon said shafts, second shafts having drums fixed thereto, cables wound about the drums of the first mentioned shafts and connected to the respective ones of the second mentioned shafts, and having connecting means at their free ends, the cables being led in opposite directions, a gear upon each of said shafts, a pair of angle levers mounted for rocking movement in proximity to the gear of each shaft, supporting means upon one arm of each lever, a gear rotatably supported by each supporting means, and movable through angular adjustment of the respective levers into and out of mesh with the gears of the first and second named shafts, an operating lever having operable connection with the outer arms of the two angle levers, whereby the angle levers may be adjusted in unison to position both of the last mentioned gears out of mesh with the gears of the first and second mentioned shafts and likewise adjusted to position either of the last mentioned gears in mesh with the gears of the first and second mentioned shafts.

In testimony whereof I affix my signature.

ROBERT JONES. [L. S.]